Oct. 2, 1962          D. R. TANGUY          3,056,917

METHODS AND APPARATUS FOR INVESTIGATING EARTH FORMATIONS

Filed Nov. 30, 1959          5 Sheets—Sheet 4

Fig. 6

Denis R. Tanguy
INVENTOR.

BY Richard E. Bee

ATTORNEY

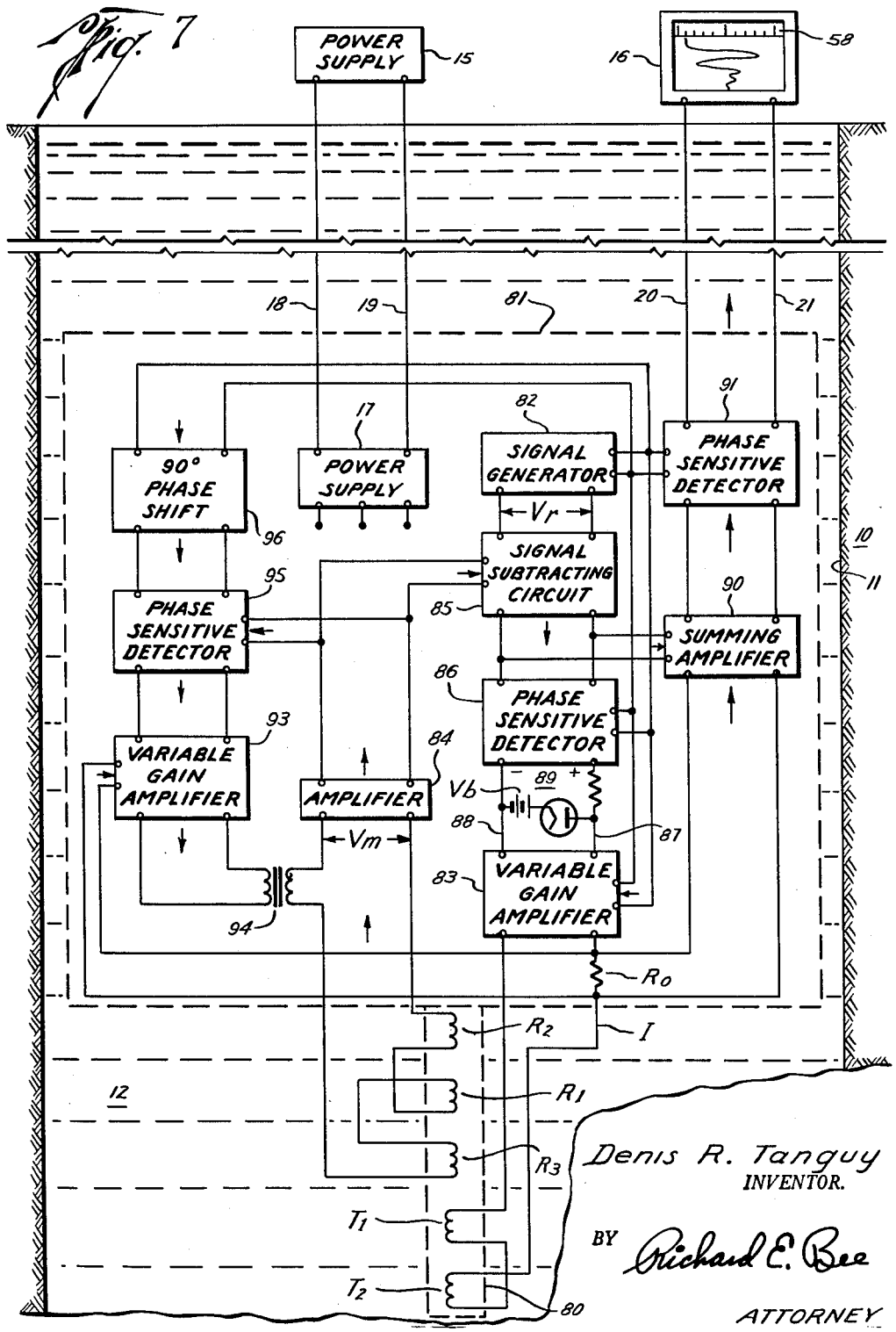

United States Patent Office 3,056,917
Patented Oct. 2, 1962

3,056,917
METHODS AND APPARATUS FOR INVESTIGATING EARTH FORMATIONS
Denis R. Tanguy, Houston, Tex., assignor to Schlumberger Well Surveying Corporation, Houston, Tex., a corporation of Texas
Filed Nov. 30, 1959, Ser. No. 856,177
25 Claims. (Cl. 324—1)

This invention relates to electrical methods and apparatus for investigating subsurface earth formations traversed by a borehole and, particularly, to such apparatus which enables the results of such investigation to be presented in a more easily and readily interpretable manner.

It is important to know the nature and characteristics of the various subsurface earth formations penetrated by a borehole drilled into the earth. In the case of oil well or gas well boreholes, for example, this information enables the presence and depth of any oil-bearing or gas-bearing formations to be determined. To this end, various types of electrical apparatus have been heretofore proposed for measuring the electrical resistance properties of such subsurface earth formations. In particular, such electrical resistance properties have been measured by moving various electrode-type and coil-type sensing units through the borehole and, at the same time, making a continuous record or log of the output signals developed by such sensing units. By studying and properly interpreting such records or logs, much valuable information is obtained regarding the subsurface formations.

A problem is frequently encountered in that the electrical resistance being measured is generally subject to a relatively wide range of variation. This electrical resistance is usually expressed either in terms of "resistivity" or in terms of "conductivity." In either case, the value of the quantity may vary over a range of from zero to infinity. This makes it difficult to record the results of such measurements on a recording medium or record strip having a finite scale width. The problem is further complicated by the fact that certain portions of the resistance range are of "quantitative" interest, that is, intended to be used in making various mathematical calculations, while other portions of the resistance range are generally used in only a "qualitative" sense in order to obtain an approximate picture of the subsurface conditions. Consequently, if the sensitivity of the apparatus is adjusted so as to enable practically all of the signal range to fit on a single scale, then the portions which are used for quantitative calculations will be too compressed or crowded together for the purposes of accurate determinations.

Various solutions have been heretofore proposed for this problem. In one case, it has been proposed to record multiple curves with different sensitivity factors. Among other things, however, this results in a multiplicity of curves which renders the interpretation more difficult. Another heretofore proposed solution makes use of a so-called "back-up" scale wherein a continuation of a high sensitivity curve is started as a low sensitivity curve on one side of the record strip, just when the high sensitivity curve goes off-scale on the other side thereof. This, however, produces discontinuous curves and tends to clutter up the record, especially where it is desired to record several different types of curves at the same time.

Apart from the matter of scale presentation, problems are also frequently encountered as to how to operate the borehole sensing apparatus so as to obtain a maximum of accuracy with a minimum of circuit complexity. The magnitude of the problems depends on the specific type of electrode or coil system being utilized, but in general there is usually room for improvement with any type of system. For example, it would be desirable to improve the signal-to-noise ratio of the apparatus, particularly under adverse borehole conditions. Also, it would be desirable to reduce the amount of electrical power expended in obtaining a desired flow of electrical current in the earth formations. Furthermore, it is frequently desired to use feedback-type control circuits for controlling the current emitted into or induced in the adjacent earth formations. In order to work over a wide range of formation resistance values, however, it it necessary to provide sufficient signal gain in these feedback circuits so as to give the proper operation under the worst conditions likely to be encountered in the borehole. This usually means that a relatively high value of signal gain is required.

It is an object of the invention, therefore, to provide new and improved methods and apparatus for measuring the electrical resistance properties of subsurface earth formations penetrated by a borehole.

It is another object of the invention to provide new and improved borehole investigating apparatus which enables the results of such investigation to be presented in a manner which is more easily and more accurately understood and interpreted.

It is a further object of the invention to provide new and improved borehole investigating apparatus which enables a wide range of measure values to be recorded as a continuous curve on a single scale and wherein one range of values is accurately and sufficiently detailed for purposes of quantitative analysis while another range is displayed with no greater accuracy than is necessary for general qualitative purposes.

It is an additional object of the invention to provide new and improved borehole investigating apparatus which provides an output signal having an improved signal-to-noise ratio under adverse borehole conditions.

It is yet another object of the invention to provide new and improved borehole investigating apparatus wherein less power is expended in obtaining a desired flow of electrical current in the adjacent earth formations.

It is a still further object of the invention to provide new and improved borehole investigating apparatus employing feedback-type control circuits wherein less signal gain is required of such circuits for a given degree of accuracy.

It is another object of the invention to provide new and improved borehole investigating apparatus which provides an improved form of scale presentation while, at the same time, providing an improved degree of circuit accuracy with a decreased amount of circuit complexity.

In accordance with one feature of the invention, a method of investigating earth formations traversed by a borehole comprises generating a flow of electrical current at a given location in the borehole which, in turn, produces electrical current flow in the adjacent earth formations. A voltage indication is then obtained which is dependent on the electrical resistance of the adjacent formation material. Over a first range of formation resistance values, the generated current is adjusted to hold constant this voltage indication. Over a second range of formation resistance values, however, the generated current is held constant. A signal is then recorded which is representative of the generated current when the voltage indication is being held constant and which is representative of the voltage indication when the generated current is being held constant. In this manner, there is obtained a composite record which is linear in terms of conductivity over one of the resistance ranges and which is linear in terms of resistivity over the other resistance range, with smooth or continuous transitions between ranges.

In accordance with another feature of the invention, apparatus for investigating earth formations traversed by a borehole comprises electrical energy transmitting means adapted for movement through the borehole. The apparatus also includes means for supplying electrical current to the transmitting means for producing electrical current flow in the adjacent earth formations. In addition, the apparatus includes means responsive to the current flow in the adjacent formations for developing a voltage signal which is dependent on the electrical resistance of the adjacent formation material. The means for supplying electrical current to the transmitting means further includes means for adjusting the supplied current to hold constant the voltage signal developed over a first range of formation resistance values and also for holding constant the supplied current over a second range of formation resistance values. The apparatus further includes means jointly responsive to both the supplied current and the voltage signal for providing an output signal which is linear in terms of conductivity over one of the resistance ranges and which is linear in terms of resistivity over the other resistance range.

For a better understanding of the present invention, together with other and further objects thereof, reference is had to the following description taken in connection with the accompanying drawings, the scope of the invention being pointed out in the appended claims.

Referring to the drawings:

FIG. 6 illustrates a further embodiment of the invention; and

FIG. 7 shows yet another embodiment of the invention.

Figure 1:
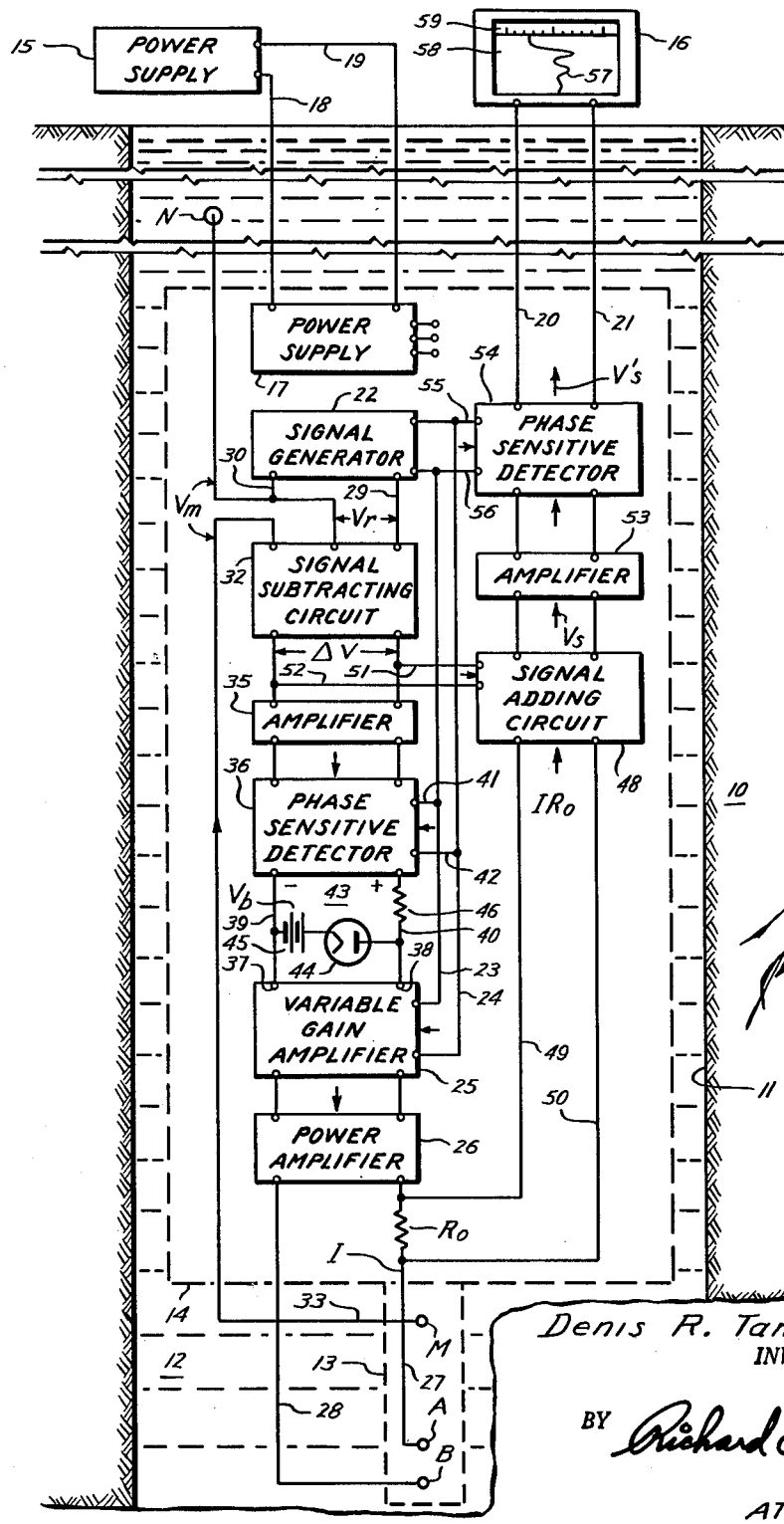
FIG. 1 illustrates in a schematic manner a representative embodiment of borehole investigating apparatus constructed in accordance with the present invention.

Referring to FIG. 1 of the drawings, there is illustrated, in a somewhat schematic manner, a representative embodiment of apparatus constructed in accordance with the present invention for investigating earth formations 10 traversed by a borehole 11. The borehole 11 is filled with a conductive liquid or drilling mud 12. The downhole portion of the apparatus includes an electrode system 13 of the so-called "lateral" or "three-electrode" type described in Patent No. 1,819,923, granted to C. Schlumberger, on August 18, 1931. The downhole portion of the apparatus also includes a fluid-tight electronic instrument housing indicated schematically by a dash line box 14. This instrument housing 14 is mechanically attached to the upper end of the electrode system 13 so that both will move in unison through the borehole 11. The downhole apparatus is suspended from the surface of the earth by way of an armored multiconductor cable which may be raised or lowered to provide for movement of the downhole apparatus through the borehole 11. Electrical connections to the portions of the apparatus located at the surface of the earth are made by way of the individual insulated conductors contained in this armored multiconductor cable.

The basic components of the surface equipment include a power supply 15 and a signal recorder 16. The surface power supply 15 is electrically connected to a downhole power supply 17, located in the instrument housing 14, by way of conductors 18 and 19 which constitute a pair of the conductors contained in the armored multiconductor cable. The downhole power supply 17 serves to develop the requisite operating voltages for the various downhole electrical circuits. For simplicity, the supply circuit interconnections between this power supply 17 and the other electrical circuits have been omitted. In a similar manner the signal recorder 16 is electrically connected to the downhole circuits by way of cable conductors 20 and 21.

Considering now the present invention in greater detail, apparatus constructed in accordance therewith includes electrical energy transmitting means adapted for movement through the borehole 11. In the present embodiment, this means includes a pair of current-emitting electrodes "A" and "B" which constitute part of the electrode system 13. As will be explained, these "A" and "B" current-emitting electrodes are energized to pass electrical current therebetween and, consequently, into the adjacent earth formations 10.

The apparatus of the present invention also includes means responsive to the current flow in the adjacent earth formations for developing a voltage signal which is dependent on the electrical resistance of the adjacent formation material. In the present embodiment, this means includes a voltage pick-up electrode "M" which also constitutes part of the electrode system 13.

The present invention further includes means for supplying electrical current to the transmitting means, in this case, the "A" and "B" electrodes, for producing electrical current flow in the adjacent earth formations. In this embodiment, this means takes the form of adjustable current supply means having an electrically-responsive control portion or control element for supplying the requisite electrode current. In particular, this means includes circuit means represented by a signal generator 22 for supplying an energizing voltage by way of conductors 23 and 24. This energizing voltage is an alternating-current voltage having a frequency of, for example, 200 cycles per second. The present current supply means also includes a variable-gain amplifier 25 which is responsive to this energizing voltage for developing the alternating output current which energizes the "A" and "B" electrodes. As shown in this embodiment, this output current is further amplified by way of a power amplifier 26 before it is applied to conductors 27 and 28 and, hence, to the "A" and "B" electrodes.

The apparatus of the present embodiment also includes degenerative feedback circuit means coupled to the voltage pick-up electrode "M" and to the variable-gain amplifier 25 portion of the current supply circuit means for automatically adjusting the emitted current to hold constant the voltage signal detected by the voltage pick-up electrode "M." This degenerative feedback circuit means includes circuit means for supplying a reference voltage $V_r$ of fixed value. In this embodiment, this reference voltage is supplied by the signal generator 22 and conductors 29 and 30. The conductor 30 is also connected to an electrically-remote potential reference point represented by an electrode "N" located on the exterior of the armored multiconductor cable at a distance of, for example, 100 feet above the top of the instrument housing 14. This fixed reference voltage $V_r$ is of the same frequency and phase as the current supplied to the "A" and "B" electrodes, the frequency for the present example, being assumed to be 200 cycles per second.

The degenerative feedback circuit means of the present embodiment also includes a signal subtracting circuit 32 responsive to both the "M" electrode voltage signal and the fixed reference voltage $V_r$ for developing a difference signal $\Delta V$ representative of the difference therebetween. As seen in the drawing, the "M" electrode voltage signal, denoted $V_m$, is supplied to the signal subtracting circuit 32 by way of a conductor 33, this voltage signal $V_m$ also being taken with respect to the electrically-remote reference point represented by the "N" electrode. This detected voltage $V_m$, like the reference voltage $V_r$, is of the same frequency and phase as the current supplied to the "A" and "B" electrodes.

The degenerative feedback circuit means of the present embodiment also includes circuit means for applying the ΔV difference signal to the gain-control element of the variable-gain amplifier 25 in a degenerative manner for adjusting the current "I" supplied to the "A" and "B" electrodes for reducing the ΔV difference signal to a minimum value approximating zero. This circuit means includes a signal amplifier 35 and a phase sensitive detector 36, the latter unit being coupled to gain control input terminals 37 and 38 of the variable-gain amplifier 25 by way of conductors 39 and 40. The phase sensitive detector 36 serves to rectify the alternating-current difference signal to provide a corresponding direct-current output signal which is proportional thereto. To this end, an actuating phase reference signal from the signal generator 22 is also supplied to the phase sensitive detector 36 by way of conductors 41 and 42.

The direct-current output signal from the phase sensitive detector 36, appearing on conductors 39 and 40, is supplied to the variable-gain amplifier 25 with the appropriate polarity for increasing the gain of amplifier 25 and, hence, the magnitude of the current flow "I" when the detected "M" electrode voltage $V_m$ is too small and, conversely, for reducing the amplifier gain when the detected voltage $V_m$ is too large. The effective overall signal gain contributed by the amplifier 35, phase sensitive detector 36, variable-gain amplifier 25, and power amplifier 26 is relatively high in order to obtain the desired degenerative feedback action wherein the ΔV difference signal is reduced very nearly to a value of zero.

The apparatus of the present embodiment also includes means for holding constant the current supplied to the transmitting means, in this case, the "A" and "B" electrodes, over a second range of formation resistance values. This means includes circuit means for disabling the degenerative feedback circuit means and, to this end, includes a clipping circuit 43 coupled in the difference signal path intermediate the signal subtracting circuit 32 and the gain-control input terminals 37 and 38 of the variable-gain amplifier 25. This clipping circuit 43 is operative whenever the difference signal ΔV exceeds a predetermined value for discontinuing the application of this difference signal to the gain-control portion of the variable-gain amplifier 25 and for, instead, applying a fixed bias signal $V_b$ thereto for holding constant the current "I" supplied to the "A" and "B" electrodes. This clipping circuit 43 includes a diode 44, a source of direct-current voltage represented by a battery 45, and a series dropping resistor 46 connected in series with the conductor 40. The battery 45 is poled to maintain the diode 44 non-conductive until the direct-current replica of the ΔV difference signal exceeds the voltage value $V_b$ of the battery 45. When this difference signal replica exceeds the $V_b$ value, then the diode 44 is rendered conductive to maintain the difference of potential between the gain-control input terminals 37 and 38 equal to the fixed bias voltage $V_b$.

The apparatus of the present invention also includes means for recording a signal representative of the generated current, in this case, the emitted current "I," when the voltage indication $V_m$ is being held constant and for recording a signal representative of the voltage indication $V_m$ when the emitted current "I" is being held constant. This provides a composite record which is linear in terms of "conductivity" over a first range of formation resistance values and which is linear in terms of "resistivity" over a second range of formation resistance values. In the present embodiment, this recording means includes a signal adding circuit 48 which is jointly responsive both to the current "I" supplied to the "A" and "B" electrodes and to the ΔV difference signal for providing an output signal which is linear in terms of formation conductivity over the operating range when the ΔV difference signal is being applied to the variable-gain amplifier 25 and which is linear in terms of formation resistivity when the fixed bias signal $V_b$ is being applied to the variable-gain amplifier 25. To this end, a first pair of input terminals of the signal adding circuit 48 is connected by way of conductors 49 and 50 to a resistor $R_o$ which is connected in series with the "A" electrode conductor 27. This resistor $R_o$ develops thereacross an alternating-current voltage ($IR_o$) which is proportional to the electrode current "I." Similarly, a second pair of input terminals of the signal adding circuit 48 is coupled to the ΔV output terminals of the signal subtracting circuit 32 by way of conductors 51 and 52. The composite alternating-current output signal $V_s$ from the signal adding circuit 48 is then supplied by way of an amplifier 53 to a phase sensitive detector 54. This phase sensitive detector 54 serves to rectify the output signal $V_s$ to develop a direct-current signal $V_s'$ which is directly proportional thereto. To this end, an actuating phase reference signal is also supplied to the phase sensitive detector 54 by way of conductors 55 and 56 which are, in turn, connected to the signal generator 22.

The recording means of this embodiment also includes linear recording means for making a linear record of the $V_s'$ replica of the $V_s$ output signal from the adding circuit 48. This linear recording means is represented by the signal recorder 16 located at the surface of the earth and electrically connected to the output of the phase sensitive detector 54 by way of the cable conductors 20 and 21. The signal recorder 16 will usually take the form of one unit of a multiunit galvanometer-type recorder, the electrical signals supplied thereto being recorded as a continuous curve 57 on a suitable recording medium or record strip 58. Means are also provided for advancing this record strip 58 in synchronism with the movement of the downhole portion of the apparatus through the borehole 11. The signal recorder 16 has associated therewith a calibrated scale 59 lying at right angles to the direction of movement of the recording medium 58. This signal recorder 16 is linear in the sense that the amount of deflection of the record curve in a direction parallel to the calibrated scale 59 is directly and linearly proportional to the value of the electrical signal supplied to the input terminals of this recorder 16. For the present FIG. 1 embodiment, the recording element of recorder 16 is adjusted to assume, in the absence of any input signal, a zero setting which is coincident with the right hand extremity of the scale range.

Figure 2:
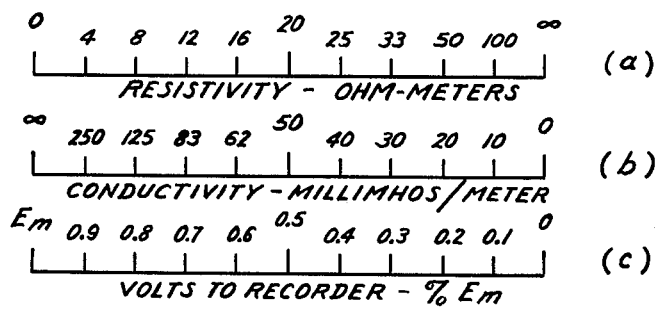
FIG. 2 shows typical scale calibrations for the FIG. 1 apparatus.

Before considering in detail the operation of the apparatus just described, it will be worthwhile to briefly consider the advantageous type of scale presentation provided thereby. To this end, reference is made to FIG. 2 of the drawings wherein are shown three possible scale calibrations for the calibrated scale 59 of the recorder 16 of FIG. 1. Note that the graduation marks on each of the scales (a), (b) and (c) of FIG. 2 are uniformly and evenly spaced. For the cases of scales (a) and (b), however, the numerical values associated with the graduation marks do not progress in a uniform manner over the entire scale range. In particular, scale (a) shows a typical scale calibration expressed in terms of formation resistivity. The left-hand half of the scale from the zero to the 20 ohm-meter mid-scale value represents a linear resistivity scale as indicated by the uniform progression of the numerical values associated with the scale marks. The right-hand half of scale (a) however, is non-linear in nature and, in fact, covers the entire remaining resistivity range from 20 ohm-meters to infinity. Actually, the numerical values over the right-hand half increase in a hyperbolic manner with respect to distance along the horizontal axis.

Scale (b) of FIG. 2, on the other hand, shows the corresponding numerical values where the scale is instead calibrated in terms of formation conductivity. Note, of course, that "conductivity" is the reciprocal of "resistivity" and both relate to the electrical resistance properties of the formation material. In other words, each conductivity value of scale (b) represents the reciprocal of the resistivity value of scale (a) lying directly above it. Thus, the 50 millimho mid-scale value of scale (b) is the reciprocal of the 20 ohm-meter mid-scale value of scale (a). In terms of linear and nonlinear portions, the conductivity calibration of scale (b) is the reverse of the resistivity calibration of scale (a). In other words, the right-hand half of scale (b) is linear in terms of formation conductivity, the numerical values progressing in a uniform manner from zero to the 50 millimho per meter mid-scale value. The left-hand half of scale (b), however, is nonlinear in terms of formation conductivity. Actually, the numerical values for this left-hand half vary in a hyperbolic manner with respect to distance along the horizontal axis where the right-hand scale extremity is taken as the zero point.

As indicated by scales (a) and (b), the complete range of resistivity or conductivity values from zero to infinity is recorded by the present apparatus as a single continuous curve on a single scale range of the recorder 16. Also, because of the composite or hybrid nature of the scale presentation, both halves of the scale range are actually linear, the left-hand half being linear in terms of formation resistivity and the right-hand half being linear in terms of formation conductivity. Also, the low resistivity range from zero to 20 ohm-meters, which is particularly important from a quantitiative standpoint, is caused to occupy a full half of the scale width.

Scale (c) of FIG. 2 shows the amount of recorder deflection expressed in terms of the voltage supplied to the input terminals of the recorder, where $E_m$ represents the input voltage required for full-scale deflection of the recorder trace. Scale (c) shows that the recorder 16 is itself quite linear in nature, the amount of trace deflection being proportional to the magnitude of the input voltage.

This advantageous form of scale presentation is obtained in accordance with the present invention by providing two different and distinct modes of operation for the downhole portion of the apparatus. In particular, for the present electrode embodiment, the downhole apparatus is operated as a "constant current" system over the left-hand or linear-resistivity half of the scale range and as a "constant voltage" system over the right-hand or linear-conductivity half of the scale range. As seen from scale (c) of FIG. 2, the downhole portion of the FIG. 1 apparatus supplies voltage signals to the recorder 16 which increase from zero to $E_m$ as the recorder trace moves from right to left. In other words, in terms of increasing signal values supplied to the recorder 16, the apparatus first operates in the constant voltage or linear conductivity mode.

Considering first this "constant voltage" or "linear conductivity" mode of operation, as the downhole apparatus including the electrode system 13 and the instrument housing 14 are moved through the borehole, the signal generator 22 is energized to generate an alternating-current output voltage which is supplied by way of conductors 23 and 24 to the input terminals of variable-gain amplifier 25. Variable-gain amplifier 25 is responsive to this alternating voltage to produce an alternating output current which is then supplied to the power amplifier 26. Power amplifier 26 serves to amplify this alternating current and then to supply it to the "A" and "B" current-emitting electrodes. On one half cycle, this amplified current flows downwardly through conductor 27, out through the "A" electrode, in through the "B" electrode, and back up through conductor 28 to complete the output circuit of power amplifier 26. On the next half cycle, this current flow is in the reverse direction. In FIG. 1, the relative spacing between the "A" and "B" electrodes is not drawn to scale compared to the indicated diameter of the borehole 11. Actually, the "A" to "B" electrode spacing is greater than the borehole diameter so that a substantial portion of the current flow passing between the "A" and "B" electrodes penetrates into the adjacent earth formations.

This flow of electrical current between the "A" and "B" electrodes serves to establish an alternating electric field surrounding the electrode system 13 and extending outwardly a substantial distance therefrom. The magnitude of this electric field at any given location, such as at the location of the voltage pickup electrode "M," is primarily dependent on the electrical resistance of the adjacent earth formation material, that is, the formation material through which the major portion of the current is flowing. In this manner, the voltage level which is sensed or detected by the pickup electrode "M" is indicative of the resistivity or conductivity of the adjacent formation material. This "M" electrode voltage level is taken with respect to the electrically-remote potential reference electrode "N" to provide an alternating-current voltage signal $V_m$ which is representative thereof.

The relationship between the current "I" supplied to the "A" and "B" electrodes, the detected "M" electrode voltage level $V_m$ and the resistivity "R" of the adjacent formation material is described by the following mathematical expression:

$$R_m = \frac{kV_m}{I} \qquad (1)$$

where "k" denotes a proportionality constant determined by the physical geometry of the electrode system (electrode spacing, electrode size, etc.). Equation 1 can be rewritten as:

$$I = kV_m C \qquad (2)$$

where "C" denotes the conductivity of the adjacent formation material and corresponds to the reciprocal of the resistivity factor "R." Thus, if the detected voltage $V_m$ is held constant, then the value of the current flow "I" provides a direct indication of the magnitude of the formation conductivity "C."

In order to hold the "M" electrode voltage level substantially constant, this $V_m$ voltage signal is supplied to a first pair of input terminals of the signals subtracting circuit 32. Supplied to a second pair of input terminals of the subtracting circuit 32 is an alternating-current reference voltage "$V_r$" of fixed value. This reference voltage $V_r$ is also taken with respect to the same electrically-remote potential reference electrode "N." Signal subtracting circuit 32 serves to subtract these two alternating-current input signals to develop an alternating-current output signal "$\Delta V$" corresponding to the difference therebetween. In other words:

$$\Delta V = V_r - V_m \qquad (3)$$

The $\Delta V$ difference signal is then amplified by the amplifier 35 and rectified by the phase-sensitive detector 36 to develop a direct-current voltage at the output of the phase-sensitive detector 36 which is directly proportional to the $\Delta V$ difference signal originally supplied to the input of the amplifier 35. The clipping circuit 43 is disabled and, hence, effectively not present for this constant-voltage or linear-conductivity mode of operation. Accordingly, its presence may be neglected for the time being. Consequently, the direct-current replica of the $\Delta V$ difference signal is supplied directly to the gain-control input terminals 37 and 38 of the variable-gain amplifier 25 during this mode of operation. The polarity of this direct-current replica is adjusted so that the feedback to the variable-gain amplifier 25 is degenerative in nature. In other words, this direct-current replica of the $\Delta V$ difference signal serves to adjust the gain of the amplifier 25 so as to adjust the output current "I" passing between the "A" and "B" electrodes so as to reduce the $\Delta V$ difference signal very nearly to zero. When this occurs, the relationship of Equation 3 may be rewritten as:

$$V_m = V_r \qquad (4)$$

In other words, this degenerative feedback action serves to hold the potential level at the voltage pickup electrode "M" substantially constant and equal to the value of the fixed reference voltage $V_r$, thereby providing the desired constant voltage mode of operation.

Since the detected voltage $V_m$ is being maintained substantially equal to the reference voltage $V_r$, Equation 2 may now be rewritten as:

$$I = kV_rC \qquad (5)$$

Since both "$k$" and "$V_r$" are now fixed constants, the electrode current "$I$" becomes directly proportional to the formation conductivity "$C$" during this mode of operation. What is desired, then, is to record a signal representative of the electrode current "$I$."

To this end, the resistor "$R_o$" connected in the series in the current flow path for the electrode current "$I$" serves to develop a voltage signal "$IR_o$" thereacross which is directly proportional to this current flow "$I$." This current-representative voltage signal is then supplied by way of conductors 49 and 50 to a first pair of input terminals of the signal adding circuit 48. As the same time, the $\Delta V$ difference signal is also supplied to a second pair of input terminals of the adding circuit 48. Consequently, the total output signal voltage "$V_s$" from the adding circuit 48 is described by the following relationship:

$$V_s = IR_o + \Delta V \qquad (6)$$

During this constant voltage mode of operation, however the $\Delta V$ difference signal is very nearly zero as compared to the $IR_o$ voltage signal. Consequently, the output signal $V_s$ is effectively equal to only the voltage signal $IR_o$. This output signal $V_s$ is then amplified by the amplifier 53 and rectified by the phase-sensitive detector 54 to develop a direct-current output signal $V_s'$ which is directly proportional to the adding circuit output signal $V_s$. This direct-current signal $V_s'$ is then supplied to the recorder 16 at the surface of the earth to control the deflection of the recorder trace over the right-hand half of the recorder scale range to provide a deflection which is linear in terms of formation conductivity.

Figure 3:
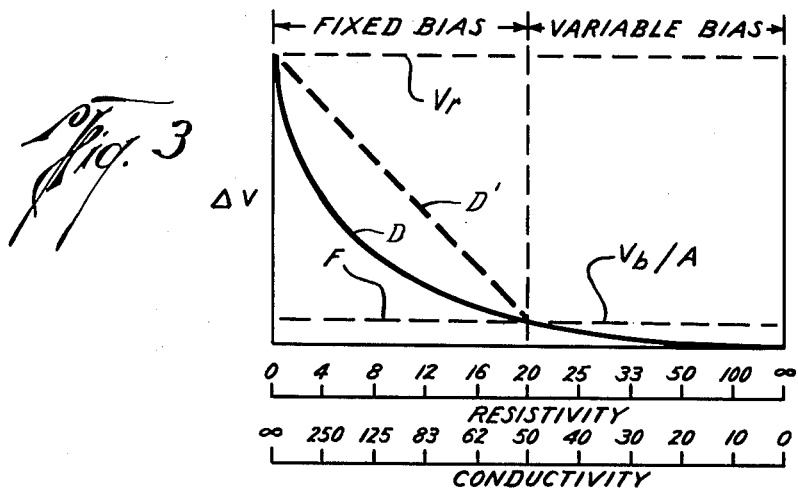
FIGS. 3 and 4 are graphs used in explaining the operation of the FIG. 1 apparatus.

In order to provide the other half of the scale range, that is, the left-hand half of the scale range, it is necessary to shift the operation of the apparatus over to a "constant current" or "linear resistivity" mode. In the FIG. 1 embodiment, this change in operating mode is provided by utilizing the $\Delta V$ difference signal to provide the necessary control action. This is possible because the $\Delta V$ difference signal is not actually constant, but rather varies as a function of the resistivity of the adjacent formation material. Assuming for the moment that the degenerative feedback loop is operative over the entire range of formation values or, in other words, that the clipping circuit 43 is completely removed from the system and the output of phase sensitive detector 36 is connected directly to the gain-control terminals of the variable gain amplifier 25, then the manner in which the $\Delta V$ difference signal will vary with formation resistivity or conductivity is indicated by curve D of the FIG. 3 graph. For clarity in displaying the entire range from zero to infinity, the horizontal axis of FIG. 3 is plotted in the same composite or hybrid manner as is used for the recorder scale calibration. The reason that $\Delta V$ varies as a function of the formation resistivity, as indicated by curve D, arises from the fact that the degenerative feedback loop includes the formation current flow path intermediate the current-emitting electrodes "A" and "B" and the pickup electrode "M." Consequently, as the formation resistivity decreases, the feedback action becomes less effective in reducing the $\Delta V$ difference signal to zero.

This departure of the $\Delta V$ difference signal from a zero value as the formation resistivity decreases indicates that the operation of the degenerative feedback loop is somewhat less than perfect, especially for the lower values of formation resistivity. This, however, does not seriously impair the operation of the apparatus during the constant voltage mode because, as indicated by curve D, the feedback action is satisfactory for the higher resistivity values encountered during this mode of operation.

In order to shift the operation of the apparatus to the constant current mode, the present embodiment includes means for recognizing when the $\Delta V$ difference signal reaches or exceeds a predetermined value corresponding to the formation resistance value at which it is desired to switch operating modes. For the present example, this formation resistance value is taken as 20 ohm-meters and the corresponding value of $\Delta V$ is indicated by voltage level F of FIG. 3. This recognizing action is provided by the clipping circuit 43 located intermediate the phase-sensitive detector 36 and the gain-control input terminals 37 and 38 of the variable-gain amplifier 25. In particular, the fixed bias voltage $V_b$ of battery 45, which maintains the clipping circuit 43 inactive during the right-hand half of the scale range, is selected so that the diode 44 will become conductive when the $\Delta V$ difference signal reaches or exceeds the desired switching level F indicated in FIG. 3. In terms of voltage levels at the output of the subtracting circuit 32, switching level F corresponds to a voltage value $V_b/A$, where A represents the gain factor provided intermediate the amplifier 35 input terminals and the phase-sensitive detector 36 output terminals.

When the diode 44 is conductive, the impedance in the shunt path formed by the diode 44 and the battery 45 is negligible compared to the impedance of the voltage-dropping resistor 46. This causes the direct-current replica of the $\Delta V$ difference signal to expand itself as a voltage drop across resistor 46 so that substantially none of it reaches the variable-gain amplifier 25. This, in effect, disables the degenerative feedback loop. Also, with the diode 44 conductive, the voltage difference provided between the gain-control input terminals 37 and 38 of the variable-gain amplifier 25 is maintained constant at a value which is equal to the value of the fixed bias voltage $V_b$. Consequently, the value of this bias voltage $V_b$ is chosen to provide a desired constant value "$I_o$" for the electrode current "$I$."

With the degenerative feedback loop disabled and the output current "$I$" being held constant at a value of "$I_o$," Equation 1 can be rewritten as:

$$V_m = \frac{I_o}{k}R \qquad (7)$$

where the only variables are the formation resistivity factor "$R$" and the detected "M" electrode voltage $V_m$. In other words, when the output current is constant, the voltage level $V_m$ is directly proportional to the formation resistivity "$R$." This condition prevails over the entire left-hand half of the scale range because the value of the $\Delta V$ difference signal remains in excess of the value of the clipping level F as the formation resistivity decreases below the mid-scale value. In particular, the $\Delta V$ difference signal now increases in a linear manner as the resistivity decreases, as indicated by dash-line curve D' of the FIG. 3 graph.

During this constant current mode of operation, it is desired to provide a recorder trace deflection which is linear in terms of resistivity. To this end, the detected electrode voltage $V_m$ is used to control the recorder trace deflection in what, at first glance, appears to be a somewhat indirect manner. In particular, this is done by supplying the $\Delta V$ difference signal to the adding circuit 48 and, consequently, to the recorder 16. It is seen by substituting both the value of $\Delta V$ given by Equation 3 and the constant value $I_o$ for the current "$I$" into Equation 6, that the output signal $V_s$ for the signal adding circuit 48 is:

$$V_s = I_oR_o + V_r - V_m \qquad (8)$$

for this constant current mode of operation. Note that the first two-quantities on the right hand side of Equation 8 are constants and the only variables that remain are the output signal $V_s$ and the detected voltage $V_m$. In other words, the output signal $V_s$ becomes directly proportional to the detected signal $V_m$ and, hence, to the formation resistivity "R" over this left-hand or linear-resistivity half of the scale range.

Figure 4:
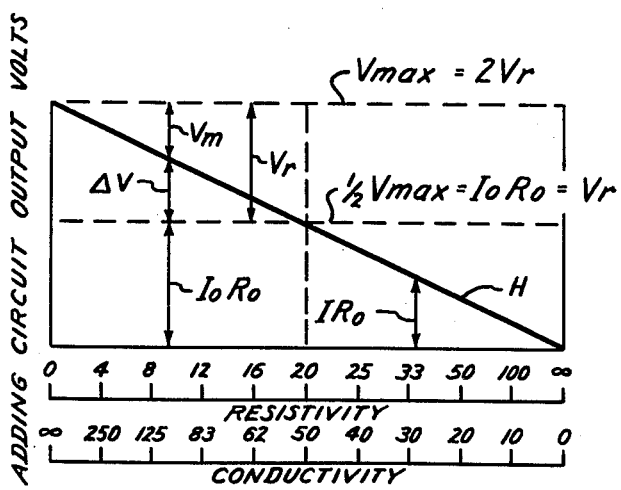

The various signal components making up the adding circuit output signal $V_s$ for both the right-hand and left-hand portions of the scale range are depicted graphically in FIG. 4. In particular, the graph of FIG. 4 shows the composition of the output signal $V_s$ for any given value of formation resistivity or conductivity, the total value of $V_s$ being indicated by the ordinate value of the straight-line segment H. Thus, over the right-hand or linear-conductivity half of the scale range, the output signal $V_s$ is formed by the voltage component $IR_o$, the $\Delta V$ component being effectively zero. At the mid-scale point, corresponding to a resistivity of 20 ohm-meters, the output signal $V_s$ becomes equal to a value of $I_oR_o$. This corresponds to a value of $\frac{1}{2}V_{max}$, where $V_{max}$ is the value of the output voltage $V_s$ which is required to produce full-scale deflection of the recorder trace. For the left-hand or linear-resistivity half of the scale range, the no-longer-negligible difference signal component $\Delta V$ is added to the now-constant voltage component $I_oR_o$ to form the total output signal $V_s$. $\Delta V$ continues to increase for decreasing resistivity values until it becomes equal to the reference voltage $V_r$. This latter event occurs for zero resistivity when the pickup electrode voltage $V_m$ is zero. From FIG. 4, it is seen that the voltage component $V_m$ decreases in a linear manner over the left-hand half of the scale range. This means that the magnitude of the recorder trace deflection taken with respect to the left-hand scale extremity is linearly proportional to the voltage component $V_m$ and, hence, to the formation resistivity "R."

In order for the linear-conductivity and linear-resistivity portions each to occupy exactly one-half of the recorder scale range, the following relationship should prevail $$I_oR_o = V_r = \frac{1}{2}V_{max} \qquad (9)$$

It will, of course, sometimes be desirable to instead have the linear-conductivity and linear-resistivity portions occupy unequal fractions of the recorder scale range. To obtain this result, the values of $I_oR_o$ and $V_r$ are selected to correspond to the fractions of $V_{max}$ corresponding to the desired apportionment of the total recorder scale range.

The assumed resistivity value of 20 ohm-meters for the mode transition point of the apparatus is intended as only an example. The mode transition point can instead be set at any other resistivity level by changing the bias voltage $V_b$ of the clipping circuit 43 to a value corresponding to the desired resistivity value.

Referring back briefly to FIG. 3, the departure of the $\Delta V$ difference signal from a value of zero over the mid-scale portion of the right-hand half of the scale range represents an error or inaccuracy in the operation of the degenerative feedback loop. This, in turn, introduces an error into the output signal recorded by the recorder 16. By including sufficient signal gain or sensitivity in the degenerative feedback loop, however, this error may be held to a small value which does not appreciably upset the accuracy of the measurement. In particular, the maximum error, which occurs at the mid-scale point, is equal to the ratio of the mode-changing voltage level F to the fixed reference voltage level $V_r$. Thus, for ±1% accuracy, the circuit parameters should be such that the voltage level F will be equal to 1% of the value of the reference voltage $V_r$ when the formation resistance assumes its mid-scale value. Over the left-hand portion of the scale range, on the other hand, the degenerative feedback loop is no longer operative and, hence, this source of error is not present. In this manner, it is not necessary that the degenerative feedback loop provide a high degree of accuracy over the entire formation resistance range. In other words, considerably less signal gain is required in the amplifier 35 to amplifier 26 portion of the apparatus than would otherwise be the case. This is particularly true because the low resistivity end of the scale represents the most adverse conditions for this type of a feedback system. In the present invention, feedback action is not required over this portion of the operating range. Similarly, a smaller variation in the dynamic gain of the variable-gain amplifier 25 is required with the present invention.

Other substantial circuit advantages also result from the present invention. In particular, less power is required in order to obtain the desired flow of the output current "I" into the adjacent earth formations. This is because the maximum value of output current $I_o$ is required only when the formations adjacent the "A" and "B" electrodes are of fairly low resistivity. Also, a substantial improvement in the signal-to-noise ratio of the downhole apparatus is made possible because the circuits of the present invention can be constructed to provide a larger sensitivity factor or volts-per-millimho factor over the lower-conductivity or right-hand end of the scale range. In other words, higher output signal levels can be provided for the cases where the formation conductivity is very low. This higher volts-per-millimho factor is practical over the right-hand half of the scale range because this factor will be automatically reduced on the left-hand side of the scale range to eliminate the danger of off-scale deflection of the recorder trace.

Figure 5:
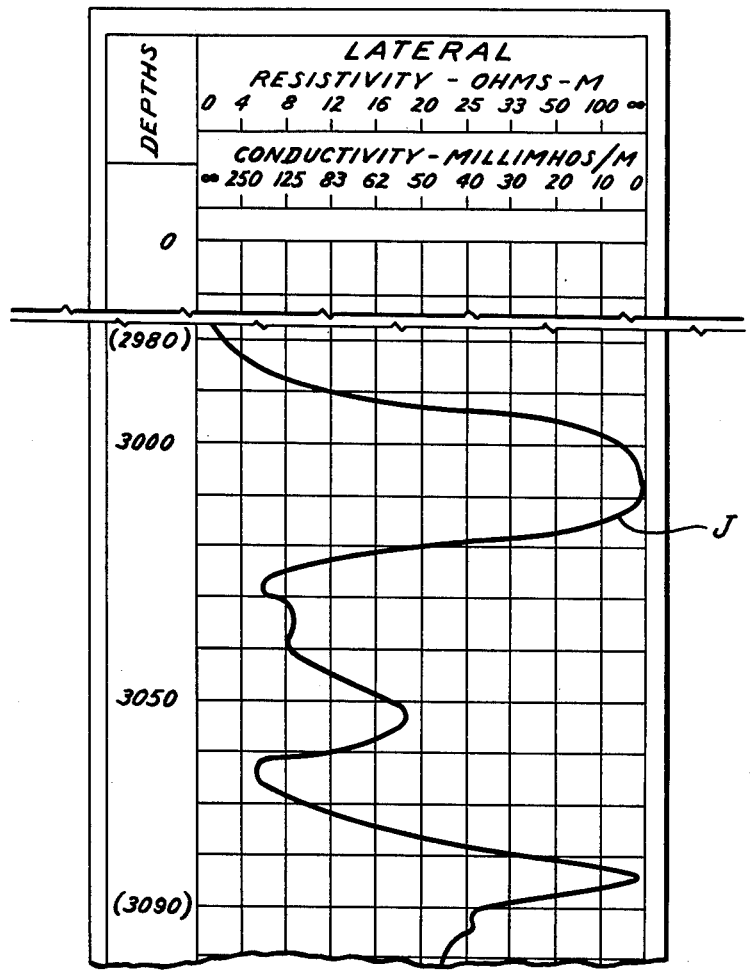
FIG. 5 is a portion of a record or log obtained with the FIG. 1 apparatus.

Referring now to FIG. 5 of the drawings, there is shown a portion of a typical record or log obtained with the "lateral" or "three-electrode" type of system of FIG. 1. FIG. 5 shows a portion of the log obtained intermediate the 2980 and 3090 foot levels in a borehole. Note that the entire resistivity range from zero to infinity is displayed on a single scale of finite width and that the recorded curve J appears as a single continuous curve. This greatly facilitates the subsequent interpretation of the log. Also, the lower resistivity values, which are of particular quantitative interest, are made to occupy a full half of the calibrated scale width and are displayed in a linear manner. This enables subsequent mathematical calculations to be made with a minimum of errors.

Referring now to FIG. 6 of the drawings, there is shown a further embodiment of the present invention. This embodiment utilizes an electrode system 60 of the so-called focussed seven-electrode type described in greater detail in Patent No. 2,712,627, granted to H. G. Doll on July 5, 1955. There is associated with this electrode system 60 a downhole instrument housing 61 which is mechanically attached to the upper portion thereof so that these units may be moved in unison through the borehole 11. The surface equipment is the same as before, the recording element for the recorder 16 again being zeroed at the right-hand extremity of the scale range.

As the electrode system 60 and the instrument housing 61 are moved through the borehole 11, a signal generator 62 operates to supply an alternating-current voltage to the input terminals of a variable-gain amplifier 63. In response to this input voltage, the amplifier 63 provides a flow of alternating output current "I" which is supplied to a current-emitting electrode $A_o$ and, hence, emitted therefrom into the adjacent earth formations. This current flow from the center $A_o$ electrode constitutes a so-called "survey" current flow. In order to confine this survey current flow to a desired lateral flow path having a minimum vertical dimension, alternating focussing current is, at the same time, emitted from a pair of outer current-emitting electrodes $A_1$ and $A_2$. The focussing current for the upper or $A_1$ electrode is provided by a first high-gain amplifier 64 which forms a degenerative feedback connection between a pair of potential pickup electrodes $M_1$ and $M_1'$ and the current-emitting electrode $A_1$. In other words, this amplifier 64 monitors the potential difference intermediate the $M_1$ and $M_1'$ pickup electrodes so as to emit the requisite amount of focussing current from the $A_1$ electrode for maintaining this $M_1$—$M_1'$ potential difference at a very small value approximating zero. In a similar manner, a second high-gain amplifier 65 is connected to a lower pair of pickup electrodes $M_2$ and $M_2'$ for emitting the requisite focussing current from the lower $A_2$ electrode for reducing the $M_2$—$M_2'$ potential difference substantially to zero. The survey current from the $A_0$ electrode and the focussing currents from the $A_1$ and $A_2$ electrodes are all returned to an electrically-remote current-return electrode "B" located a substantial distance above the electrode system 60.

As for the FIG. 1 embodiment, the apparatus of FIG. 6 is constructed to have both "constant voltage" and "constant current" modes of operation so that the signal recorded by the recorder 16 will be linear in terms of formation conductivity over the right-hand half of the scale range and linear in terms of formation resistivity over the left-hand half of the scale range. In order to provide the constant voltage mode of operation, a voltage indication representative of the average value of the two potential levels mid-way between the two pairs of pickup electrodes $M_1$—$M_1'$ and $M_2$—$M_2'$ is developed by averaging resistors 66–69, inclusive, and supplied by a conductor 70 to one of a first pair of input terminals of a difference amplifier 71. This voltage indication $V_m$ is taken with respect to the electrically-remote potential-reference electrode "N" which is connected to the other of the first pair of difference amplifier input terminals. Also supplied to the difference amplifier 71, by way of a second pair of input terminals, is a fixed reference signal $V_r$ which, likewise, is referenced to the remote electrode "N." The amplified difference signal appearing at the output of amplifier 71 is then rectified by a phase sensitive detector 72 and subsequently supplied by way of conductors 73 and 74 to the gain-control input terminals of the variable-gain amplifier 63. The polarity of this rectified signal is chosen to provide a degenerative feedback adjustment of the survey current "I" such as to maintain the average potential level $V_m$ intermediate the pairs of pickup electrodes substantially constant and equal to the fixed reference voltage $V_r$.

As before, a clipping circuit 75 is provided between the phase sensitive detector 72 output and the gain-control input of the variable-gain amplifier 63. This clipping circuit remains inactive during the constant voltage or linear conductivity mode of operation during which the recorder trace lies on the right-hand half of the scale range. When the mid-scale point is reached or exceeded, as indicated by the appropriate value of the amplified difference signal, the clipping circuit 75 becomes active to disable the feedback loop and to apply instead a fixed bias signal $V_b$ to the variable-gain amplifier 63. This shifts the system into the constant current mode of operation wherein the output survey current "I" is held at a fixed and constant value and the variations in the average detected voltage $V_m$ becomes directly proportional to the resistivity of the adjacent formation material.

The composite output signal supplied to the recorder 16 is developed by a summing amplifier 76 which serves to add the current-representative voltage signal $IR_o$ and the amplified difference signal supplied thereto. The resultant output signal is then rectified by a phase sensitive detector 77 to provide a direct-current replica thereof. This direct-current replica is then supplied by way of cable conductors 20 and 21 to the signal recorder 16 located at the surface of the earth. In this manner, there is again provided a composite type of record or log wherein one half of the scale range is linear in terms of formation conductivity, while the other half is linear in terms of formation resistivity.

Referring now to FIG. 7 of the drawings, there is shown a further embodiment of the present invention wherein the electrical energy transmitting means for producing the electrical current flow in the adjacent earth formations takes the form of coil means, as opposed to the previously discussed electrode means. To this end, the apparatus of FIG. 7 includes a coil system 80 having a pair of transmitter coils $T_1$ and $T_2$ which, when energized with alternating current, serve to electromagnetically induce electrical current flow in the adjacent earth formations. The coil system 80 also includes three receiver coils, $R_1$, $R_2$ and $R_3$, which are responsive to the current flow induced in the adjacent earth formations for developing a net voltage signal which is representative of the electrical resistance of the adjacent formation material. Coil systems or "induction logging" systems of this type are described in greater detail in Patent 2,582,314, granted to H. G. Doll on January 15, 1952.

Suitable downhole circuits for operating this coil system 80 are included within a fluid-tight instrument housing 81 which is attached to the upper end of the coil system 80. These circuits include a signal generator 82 which generates an alternating-current output voltage having a frequency of, for example, 20 kilocycles per second. This alternating output voltage serves to actuate a variable-gain amplifier 83 to provide an alternating output current "I" which flows through the series-connected transmitter coils $T_1$ and $T_2$. The alternating flux field set up by these transmitter coils then serves to electromagnetically induce current flow in the adjacent earth formations. This current usually flows in circular loops concentric with the longitudinal axis of the borehole 11. This induced current flow in turn induces voltages in the three series-connected receiver coils $R_1$, $R_2$ and $R_3$. As indicated in the above-mentioned Patent No. 2,582,314, the coil polarities, the relative number of coil turns, and the relative spacings between coils are constructed to provide for cancellation of the receiver coil voltage components induced by direct flux coupling between transmitter and receiver coils and also to provide for cancellation of voltage components caused by formation current flow in regions above and below the ends of the coil system 80. This latter type of cancellation provides a so-called "vertical focussing" action which limits the vertical extent of the zone being investigated to a region not much greater than the overall vertical length of the coil system 80 itself.

As for the case of the electrode systems previously discussed, the coil system of FIG. 7 is operated as a constant current system over one-half of the scale range and as a constant voltage system over the other half of the scale range, thereby to provide the desired type of composite scale presentation. For a homogeneous formation, the relationship between the transmitter coil current "I" and the net receiver coil voltage $V_m$ resulting from current flow induced in the adjacent formations is described by the following mathematical expression:

$$V_m = kIC \qquad (10)$$

where "k" denotes the geometry coefficient for the coil system 80 and "C" again denotes the conductivity of the adjacent formation material. If the transmitter coil current "I" is held constant, then the net receiver coil voltage $V_m$ becomes directly proportional to the formation conductivity "C." In other words, if the coil system is operated as a constant current system, then the output signal is linear in terms of "conductivity." This is the reverse of the electrode system situation because when an electrode system is operated as a constant current system, then the output signal is linear in terms of "resistivity." Similarly, when the coil system 80 is operated as a constant voltage system, the output signal will be linear in terms of formation resistivity. This again represents the reverse of the situation that occurs for an electrode system. In other words, the constant current and constant voltage regions are interchanged for the case of a coil system as compared to an electrode system. Consequently, for a coil system, the recording element for the recorder 16 is zeroed at the left-hand extremity of the scale range and the recorder trace deflection moves from left to right for increasing values of output signal voltage from the downhole portion of the apparatus. Except for these differences, the two mode feature of the coil system operation is generally analogous to that already discussed for the case of electrode systems.

Considering first the constant voltage or linear-resistivity mode of operation, the in-phase voltage $V_m$ developed across the series-connected receiver coils $R_1$, $R_2$ and $R_3$ is supplied by way of an amplifier 84 to a first pair of input terminals of a signal subtracting circuit 85. By "in phase" is meant an alternating signal having the same phase as the transmitter coil current "I." This is the phase of the receiver coil voltage components produced by the resistive component of the current flow induced in the adjacent formations. Supplied to a second pair of input terminals of the subtracting circuit 85 is an alternating-current reference signal $V_r$ of fixed value. The subtracting circuit 85 serves to subtract these two signals to provide a corresponding alternating-current difference signal. This difference signal is rectified by a phase sensitive detector 86 and then applied by way of conductors 87 and 88 to the gain-control input terminals of the variable-gain amplifier 83. During this constant voltage mode of operation, a clipping circuit 89 located intermediate the phase sensitive detector 86 and the variable-gain amplifier 83 is inoperative and, hence, effectively not present. The rectified difference signal supplied to the gain-control terminals of the amplifier 83 is applied with the appropriate polarity to provide a degenerative feedback action wherein the magnitude of the transmitter coil current "I" is automatically adjusted to maintain the net in-phase receiver coil voltage $V_m$ at a constant value which is proportional to the reference voltage $V_r$.

Equation 10 can be rewritten in the form:

$$I = \frac{V_m}{kC} = \frac{V_m}{k}R \qquad (11)$$

With the degenerative feedback loop operative, $V_m$ is held substantially constant at a value proportional to the fixed reference voltage $V_r$. Consequently, Equation 11 becomes:

$$I = \frac{k'V_r}{k}R = KR \qquad (12)$$

where $k'$ and $K$ are the appropriate proportionality constants.

It is thus seen that when the feedback loop is operative, the magnitude of the transmitter coil current "I" is directly proportional to the formation resistivity "R." Consequently, the transmitter coil current "I" is monitored by a current-measuring resistor $R_0$ to develop a corresponding voltage signal which is then supplied to a summing amplifier 90. At the same time, the difference signal at the output of subtracting circuit 85 is also being supplied to the summing amplifier 90. During this constant voltage mode of operation, however, the difference signal is effectively maintained at a zero value so that the resultant output signal from the summing amplifier 90 is directly proportional to the transmitter coil current "I" and, hence, to the formation resistivity "R." This summing amplifier output signal is then rectified by a phase sensitive detector 91 and supplied by way of cable conductors 20 and 21 to the recorder 16 located at the surface of the earth. In this manner, a linear resistivity signal is provided over the left-hand half of the recorder scale range, the recorder trace deflection moving towards the right as the magnitude of the transmitter coil current and, hence, the formation resistivity increases.

When the formation resistivity exceeds the selected mid-scale value, the rectified difference signal applied across the clipping circuit 89 is sufficiently large so as to render this clipping circuit 89 operative to disable the feedback loop and instead to supply a fixed bias signal $V_b$ to the variable-gain amplifier 83. This shifts the coil system into the constant current mode of operation. During this mode of operation, the voltage signal developed across the current-measuring resistor $R_0$ remains constant. The difference signal input to the summing amplifier 90, however, now assumes a significant valve which increases as the net in-phase receiver coil signal $V_m$ decreases with increasing formation resistivity. The receiver coil voltage $V_m$ becomes zero, the difference signal achieves a maximum value corresponding to the fixed reference voltage $V_r$ and the recorder trace deflection reaches the right-hand extremity of the scale range when the formation resistivity becomes infinite. In this range when the formation resistivity becomes infinite. In this manner, during this constant current mode of operation, the output signal from the summing amplifier 90 is proportional to the net in-phase receiver coil voltage $V_m$ and, hence, is linear in terms of formation conductivity. There is thus provided the desired composite type of scale presentation.

The coil system apparatus of FIG. 7 also includes an auxiliary feedback loop which is operative for both the constant current and the constant voltage modes of operation and which serves to cancel any residual reactive signal components contained in the net receiver coil output voltage. These undesired reactive components are readily distinguishable in that they are 90° out of phase with respect to the transmitter coil current and, hence, with respect to the desired $V_m$ components. This auxiliary or reactive-signal feedback loop includes a variable-gain amplifier 93 which is responsive to the voltage signal developed across the measuring resistor $R_0$ to develop a 90°-phased voltage across the secondary winding of a transformer 94, which secondary winding is connected in series with the receiver coils. This secondary winding voltage is in phase with the reactive signal components but of opposite polarity thereto for producing the desired cancellation thereof. The operation of this variable-gain amplifier 93 is controlled by a phase sensitive detector 95 which serves to select and rectify any reactive components appearing at the output of the amplifier 84. This selection of only the reactive components is obtained by using a phase reference signal for the phase sensitive detector 95 which is shifted in phase by a factor of 90° by a phase shift network 96. The rectified output voltage from the phase sensitive detector 95, therefore, is proportional to any reactive components appearing at the output of amplifier 84. This rectified voltage then serves to adjust the gain of amplifier 93 so that the opposite-polarity reactive-phase voltage developed across the secondary winding of transformer 94 will substantially cancel any reactive components coming from the receiver coils.

Various modifications which may be made in the foregoing embodiments of the present invention should be mentioned briefly at this point. In particular, instead of using a clipping circuit to obtain the change in operating mode, use may instead be made of the fact that a variable-gain amplifier has an upper limit as to the amount of output current that can be provided. In other words, the gain-control characteristic of a variable-gain amplifier has a saturation level above which no further increase in output current is obtained for further increases in the bias control voltage. The apparatus may thus be constructed so that the maximum output current for this saturation condition corresponds to the desired constant current value $I_0$. Assuming, on the other hand, that it is necessary to utilize some form of control circuit for switching the downhole apparatus from one mode of operation to the other, then it is not mandatory that the $\Delta V$ difference signal be used for actuating this control circuit. Instead, either the adding circuit or summing amplifier output signal or the output current flow "I" may be sensed to determine when to change from one mode of operation to the other.

From the foregoing description of the various embodiments of the present invention, it is seen that the present invention provides both an improved form of scale presentation for the recorded data and a form of apparatus which has less stringent operating requirements for a given degree of accuracy than many of the various types of electrical borehole investigating apparatus heretofore proposed.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A method of investigating earth formations traversed by a borehole comprising: generating a flow of electrical current at a given location in the borehole which produces electrical current flow in the adjacent earth formations; obtaining a voltage indication which is dependent on the electrical resistance of the adjacent formation material; adjusting the generated current to hold constant the voltage indication obtained over a first range of formation resistance values; holding constant the generated current over a second range of formation resistance values; and recording a signal representative of the generated current when the voltage indication is being held constant and recording a signal representative of the voltage indication when the generated current is being held constant thereby to obtain a composite record which is linear in terms of conductivity over one of the resistance ranges and which is linear in terms of resistivity over the other resistance range.

2. A method of investigating earth formations traversed by a borehole comprising: emitting electrical current from a location in the borehole into the adjacent earth formations; detecting a voltage developed in the vicinity of this location by the flow of this emitted current; adjusting the emitted current to hold constant the detected voltage over a first range of formation resistance values; holding constant the emitted current over a second range of formation resistance values; and recording a signal representative of the emitted current when the detected voltage is being held constant and recording a signal representative of the detected voltage when the emitted current is being held constant thereby to obtain a composite record which is linear in terms of conductivity over the first resistance range and which is linear in terms of resistivity over the second resistance range.

3. A method of investigating earth formations traversed by a borehole comprising: generating a flow of electrical current at a given location in the borehole for electromagnetically inducing electrical current flow in the adjacent earth formations; obtaining a voltage indication by sensing the electromagnetic field produced by the induced current flow; adjusting the generated current to hold constant the voltage indication obtained over a first range of formation resistance values; holding constant the generated current over a second range of formation resistance values; and recording a signal representative of the generated current when the voltage indication is being held constant and recording a signal representative of the voltage indication when the generated current is being held constant thereby to obtain a composite record which is linear in terms of conductivity over the second resistance range and which is linear in terms of resistivity over the first resistance range.

4. In apparatus for investigating earth formations traversed by a borehole, the combination comprising: electrical energy transmitting means adapted for movement through the borehole; means for supplying electrical current to the transmitting means for producing electrical current flow in the adjacent earth formations; means responsive to the current flow in the adjacent formations for developing a voltage signal which is dependent on the electrical resistance of the adjacent formation material; said current supply means including means for adjusting the current supplied to the transmitting means to hold constant the voltage signal developed over a first range of formation resistance values and for holding constant the current supplied to the transmitting means over a second range of formation resistance values; and means jointly responsive to both the supplied current and the voltage signal for providing an output signal which is linear in terms of conductivity over one of the resistance ranges and which is linear in terms of resistivity over the other resistance range.

5. In apparatus for investigating earth formations traversed by a borehole, the combination comprising: electrical energy transmitting means adapted for movement through the borehole; means for supplying electrical current to the transmitting means for producing electrical current flow in the adjacent earth formations; means responsive to the current flow in the adjacent formations for developing a voltage signal which is dependent on the electrical resistance of the adjacent formation material; means for adjusting the current supplied to the transmitting means to hold constant the voltage signal developed over a first range of formation resistance values and for holding constant the current supplied to the transmitting means over a second range of formation resistance values; and means jointly responsive to both the supplied current and the voltage signal for providing an output signal which is linear in terms of conductivity over one of the resistance ranges and which is linear in terms of resistivity over the other resistance range.

6. In apparatus for investigating earth formations traversed by a borehole, the combination comprising: electrical energy transmitting means adapted for movement through the borehole; means for supplying electrical current to the transmitting means for producing electrical current flow in the adjacent earth formations; means responsive to the current flow in the adjacent formations for developing a voltage signal which is dependent on the electrical resistance of the adjacent formation material; means for adjusting the current supplied to the transmitting means to hold constant the voltage signal developed over a first range of formation resistance values; means for holding constant the current supplied to the transmitting means over a second range of formation resistance values; and means jointly responsive to both the supplied current and the voltage signal for providing an output signal which is linear in terms of conductivity over one of the resistance ranges and which is linear in terms of resistivity over the other resistance range.

7. In apparatus for investigating earth formations traversed by a borehole, the combination comprising: electrode means adapted for movement through the borehole; means for energizing the electrode means for emitting electrical current into the adjacent earth formations; means for detecting a voltage developed in the vicinity of the electrode means by the flow of this emitted current; means for adjusting the emitted current to hold constant the detected voltage over a first range of formation resistance values; means for holding constant the emitted current over a second range of formation resistance values; and means jointly responsive to both the emitted current and the detected voltage for providing an output signal which is linear in terms of conductivity over the first resistance range and which is linear in terms of resistivity over the second resistance range.

8. In apparatus for investigating earth formations traversed by a borehole, the combination comprising: coil means adapted for movement through the borehole; means for supplying electrical current to the coil means for electromagnetically inducing electrical current flow in the adjacent earth formations; means responsive to the electromagnetic field produced by the induced current flow in the adjacent formations for developing a voltage signal which is dependent on the electrical resistance of the adjacent formation material; means for adjusting the current supplied to the coil means to hold constant the voltage signal developed over a first range of formation resistance values; means for holding constant the current supplied to the coil means over a second range of formation resistance values; and means jointly responsive to the supplied current and the voltage signal for providing an output signal which is linear in terms of conductivity over the second resistance range and which is linear in terms of resistivity over the first resistance range.

9. In apparatus for investigating earth formations traversed by a borehole, the combination comprising: means for emitting electrical current from a location in the borehole into the adjacent earth formation; means for detecting a voltage developed in the vicinity of this location by the flow of this emitted current; means for adjusting the emitted current to hold constant the detected voltage over a first range of formation resistance values and for holding constant the emitted current over a second range of formation resistance values; and means for recording the value of the emitted current when the detected voltage is being held constant and for recording the value of the detected voltage when the emitted current is being held constant.

10. In apparatus for investigating earth formations traversed by a borehole, the combination comprising: means for electromagnetically inducing electrical current flow in the earth formations adjacent a given location in the borehole; means for energizing the inducing means with electrical current; means responsive to the induced current flow for developing a voltage signal representative thereof; means for adjusting the energizing current to hold constant the voltage signal developed over a first range of formation resistance values and for holding constant the energizing current over a second range of formation resistance values; and means for recording the value of the energizing current when the voltage signal is being held constant and for recording the value of the voltage signal when the energizing current is being held constant.

11. In apparatus for investigating earth formations traversed by a borehole, the combination comprising: an electrode system adapted for movement through the borehole and including at least one current-emitting electrode and at least one voltage pick-up electrode; circuit means for energizing the current-emitting electrode for emitting electrical current into the adjacent earth formations; degenerative feedback circuit means coupled to the voltage pick-up electrode and to the energizing circuit means for automatically adjusting the emitted current to hold constant the voltage detected by the voltage pick-up electrode; circuit means for disabling the feedback circuit means and holding constant the emitted current over a given range of formation resistance values; and circuit means jointly responsive to both the emitted current and the detected voltage for providing an output signal which is linear in terms of formation conductivity when the detected voltage is being held constant and which is linear in terms of formation resistivity when the emitted current is being held constant.

12. In apparatus for investigating earth formations traversed by a borehole, the combination comprising: an electrode system adapted for movement through the borehole and including at least one current-emitting electrode and at least one voltage pick-up electrode; circuit means for supplying an energizing voltage; variable-gain amplifier circuit means responsive to the energizing voltage for energizing the current-emitting electrode for emitting electrical current into the adjacent earth formations; degenerative feedback circuit means coupled to the voltage pick-up electrode and to the amplifier circuit means for automatically adjusting the emitted current to hold constant the voltage detected by the voltage pick-up electrode; circuit means for disabling the feedback circuit means and holding constant the emitted current over a given range of formation resistance values; and circuit means jointly responsive to both the emitted current and the detected voltage for providing an output signal which is linear in terms of formation conductivity when the detected voltage is being held constant and which is linear in terms of formation resistivity when the emitted current is being held constant.

13. In apparatus for investigating earth formations traversed by a borehole, the combination comprising: an electrode system adapted for movement through the borehole and including at least one current-emitting electrode and at least one voltage pick-up electrode; circuit means for energizing the current-emitting electrode for emitting electrical current into the adjacent earth formations; degenerative feedback circuit means coupled to the voltage pick-up electrode and to the energizing circuit means for automatically adjusting the emitted current to hold constant the voltage detected by the voltage pick-up electrode; clipping circuit means located in the feedback path for disabling the feedback circuit means and holding constant the emitted current over a given range of formation resistance values; and circuit means jointly responsive to both the emitted current and the detected voltage for providing an output signal which is linear in terms of formation conductivity when the detected voltage is being held constant and which is linear in terms of formation resistivity when the emitted current is being held constant.

14. In apparatus for investigating earth formations traversed by a borehole, the combination comprising: an electrode system adapted for movement through the borehole and including at least one current-emitting electrode and at least one voltage pick-up electrode; circuit means for energizing the current-emitting electrode for emitting electrical current into the adjacent earth formations; degenerative feedback circuit means coupled to the voltage pick-up electrode and to the energizing circuit means for automatically adjusting the emitted current to hold constant the voltage detected by the voltage pick-up electrode; circuit means for disabling the feedback circuit means and holding constant the emitted current over a given range of formation resistance values; circuit means jointly responsive to both the emitted current and the detected voltage for providing an output signal which is linear in terms of formation conductivity when the detected voltage is being held constant and which is linear in terms of formation resistivity when the emitted current is being held constant; and linear recording means for making a linear record of this output signal.

15. In apparatus for investigating earth formations traversed by a borehole, the combination comprising: an electrode system adapted for movement through the borehole and including at least one current-emitting electrode and at least one voltage pick-up electrode; circuit means for supplying an energizing voltage; variable-gain amplifier circuit means responsive to the energizing voltage for energizing the current-emitting electrode for emitting electrical current into the adjacent earth formations; degenerative feedback circuit means coupled to the voltage pick-up electrode and to the amplifier circuit means for automatically adjusting the emitted current to hold constant the voltage detected by the voltage pick-up electrode; clipping circuit means located in the feedback path for disabling the feedback circuit means and holding constant the emitted current over a given range of formation resistance values; signal adding circuit means jointly responsive to both the emitted current and the detected voltage for providing an output signal which is linear in terms of formation conductivity when the detected voltage is being held constant and which is linear in terms of formation resistivity when the emitted current is being held constant; and linear recording means for making a linear record of this output signal.

16. In apparatus for investigating earth formations traversed by a borehole, the combination comprising: a coil system adapted for movement through the borehole and including at least one transmitter coil and at least one receiver coil; circuit means for supplying energizing current to the transmitter coil for electromagnetically inducing electrical current flow in the adjacent earth formations; degenerative feedback circuit means coupled to the receiver coil and to the supply circuit means for automatically adjusting the energizing current to hold constant the voltage developed across the receiver coil by the induced current flow in the formation; circuit means for disabling the feedback circuit means and holding constant the energizing current over a given range of formation resistance values; and circuit means jointly responsive to both the energizing current and the receiver coil voltage for providing an output signal which is linear in terms of formation resistivity when the receiver coil voltage is being held constant and which is linear in terms of formation conductivity when the energizing current is being held constant.

17. In apparatus for investigating earth formations traversed by a borehole, the combination comprising: a coil system adapted for movement through the borehole and including at least one transmitter coil and at least one receiver coil; circuit means for supplying an energizing voltage; variable-gain amplifier circuit means responsive to the energizing voltage for supplying energizing current to the transmitter coil for electromagnetically inducing electrical current flow in the adjacent earth formations; degenerative feedback circuit means coupled to the receiver coil and to the amplifier circuit means for automatically adjusting the energizing current to hold constant the voltage developed across the receiver coil by the induced current flow in the formation; circuit means for disabling the feedback circuit means and holding constant the energizing current over a given range of formation resistance values; and circuit means jointly responsive to both the energizing current and the receiver coil voltage for providing an output signal which is linear in terms of formation resistivity when the receiver coil voltage is being held constant and which is linear in terms of formation conductivity when the energizing current is being held constant.

18. In apparatus for investigating earth formations traversed by a borehole, the combination comprising: a coil system adapted for movement through the borehole and including at least one transmitter coil and at least one receiver coil; circuit means for supplying energizing current to the transmitter coil for electromagnetically inducing electrical current flow in the adjacent earth formations; degenerative feedback circuit means coupled to the receiver coil and to the supply circuit means for automatically adjusting the energizing current to hold constant the voltage developed across the receiver coil by the induced current flow in the formation; clipping circuit means located in the feedback path for disabling the feedback circuit means and holding constant the energizing current over a given range of formation resistance values; and circuit means jointly responsive to both the energizing current and the receiver coil voltage for providing an output signal which is linear in terms of formation resistivity when the receiver coil voltage is being held constant and which is linear in terms of formation conductivity when the energizing current is being held constant.

19. In apparatus for investigating earth formations traversed by a borehole, the combination comprising: a coil system adapted for movement through the borehole and including at least one transmitter coil and at least one receiver coil; circuit means for supplying energizing current to the transmitter coil for electromagnetically inducing electrical current flow in the adjacent earth formations; degenerative feedback circuit means coupled to the receiver coil and to the supply circuit means for automatically adjusting the energizing current to hold constant the voltage developed across the receiver coil by the induced current flow in the formation; circuit means for disabling the feedback circuit means and holding constant the energizing current over a given range of formation resistance values; circuit means jointly responsive to both the energizing current and the receiver coil voltage for providing an output signal which is linear in terms of formation resistivity when the receiver coil voltage is being held constant and which is linear in terms of formation conductivity when the energizing current is being held constant; and linear recording means for making a linear record of this output signal.

20. In apparatus for investigating earth formations traversed by a borehole, the combination comprising: a coil system adapted for movement through the borehole and including at least one transmitter coil and at least one receiver coil; circuit means for supplying an energizing voltage; variable-gain amplifier circuit means responsive to the energizing voltage for supplying energizing current to the transmitter coil for electromagnetically inducing electrical current flow in the adjacent earth formations; degenerative feedback circuit means coupled to the receiver coil and to the amplifier circuit means for automatically adjusting the energizing current to hold constant the voltage developed across the receiver coil by the induced current flow in the formation; clipping circuit means located in the feedback path for disabling the feedback circuit means and holding constant the energizing current over a given range of formation resistance values; signal adding circuit means jointly responsive to both the energizing current and the receiver coil voltage for providing an output signal which is linear in terms of formation resistivity when the receiver coil voltage is being held constant and which is linear in terms of formation conductivity when the energizing current is being held constant; and linear recording means for making a linear record of this output signal.

21. In apparatus for investigating earth formations traversed by a borehole, the combination comprising: electrical energy transmitting means adapted for movement through the borehole; adjustable current supply means including an electrically-responsive control portion for supplying electrical current to the transmitting means for producing electrical current flow in the adjacent earth formations; means responsive to the current flow in the adjacent formations for developing a voltage signal which is dependent on the electrical resistance of the adjacent formation material; circuit means for supplying a reference voltage of fixed value; circuit means responsive to both the voltage signal and the fixed reference voltage for developing a difference signal representative of the difference therebetween; circuit means for applying the difference signal to the control portion of the current supply means in a degenerative manner for adjusting the current supplied to the transmitting means for reducing the difference signal to a minimum; circuit means operative over a given range of formation resistance values for discontinuing the application of the difference signal to the control portion and for instead applying a fixed bias signal thereto for holding constant the current supplied to the transmitting means; and circuit means jointly responsive to both the current supplied to the transmitting means and the difference signal for providing an output signal which is linear in terms of formation conductivity when one of the difference and fixed bias signals is being applied to the control portion and which is linear in terms of formation resistivity when the other of the difference and fixed bias signals is being applied to the control portion.

22. In apparatus for investigating earth formations traversed by a borehole, the combination comprising: electrical energy transmitting means adapted for movement through the borehole; adjustable current supply means including an electrically-responsive control portion for supplying electrical current to the transmitting means for producing electrical current flow in the adjacent earth formations; means responsive to the current flow in the adjacent formations for developing a voltage signal which is dependent on the electrical resistance of the adjacent formation material; circuit means for supplying a reference voltage of fixed value; circuit means responsive to both the voltage signal and the fixed reference voltage for developing a difference signal representative of the difference therebetween; circuit means for applying the difference signal to the control portion of the current supply means in a degenerative manner for adjusting the current supplied to the transmitting means for reducing the difference signal to a minimum; circuit means responsive to the difference signal and operative whenever the difference signal exceeds a predetermined value for discontinuing the application of the difference signal to the control portion and for instead applying a fixed bias signal thereto for holding constant the current supplied to the transmitting means; and circuit means jointly responsive to both the current supplied to the transmitting means and the difference signal for providing an output signal which is linear in terms of formation conductivity when one of the difference and fixed bias signals is being applied to the control and which is linear in terms of formation resistivity when the other of the difference and fixed bias signals is being applied to the control portion.

23. In apparatus for investigating earth formations traversed by a borehole, the combination comprising: electrical energy transmitting means adapted for movement through the borehole; circuit means for supplying an energizing voltage; variable-gain amplifier circuit means responsive to the energizing voltage for supplying electrical current to the transmitting means for producing electrical current flow in the adjacent earth formations, this amplifier circuit means including an electrically-responsive control element for adjusting the magnitude of the supplied current; means responsive to the current flow in the adjacent formations for developing a voltage signal which is dependent on the electrical resistance of the adjacent formation material; circuit means for supplying a reference voltage of fixed value; signal subtracting circuit means responsive to both the voltage signal and the fixed reference voltage for developing a difference signal representative of the difference therebetween; circuit means for applying the difference signal to the control element of the variable-gain amplifier circuit means in a degenerative manner for adjusting the current supplied to the transmitting means for reducing the difference signal to a minimum; clipping circuit means coupled in the difference signal path intermediate the signal subtracting circuit means and the amplifier control element and operative whenever the difference signal exceeds a predetermined value for discontinuing the application of the difference signal to the control element and for instead applying a fixed bias signal thereto for holding constant the current supplied to the transmitting means; and signal adding circuit means jointly responsive to both the current supplied to the transmitting means and the difference signal for providing an output signal which is linear in terms of formation conductivity when one of the difference and fixed bias signals is being applied to the control element and which is linear in terms of formation resistivity when the other of the difference and fixed bias signals is being applied to the control element.

24. In apparatus for investigating earth formations traversed by a borehole, the combination comprising: an electrode system adapted for movement through the borehole and including at least one current-emitting electrode and at least one voltage pick-up electrode; adjustable current supply means including an electrically-responsive control portion for supplying electrical current to the current-emitting electrode for emitting electrical current into the adjacent earth formations; the pick-up electrode being responsive to the current flow in the adjacent formations for providing a voltage signal which is dependent on the electrical resistance of the adjacent formation material; circuit means for supplying a reference voltage of fixed value; circuit means responsive to both the voltage signal and the fixed reference voltage for developing a difference signal representative of the difference therebetween; circuit means for applying the difference signal to the control portion of the current supply means in a degenerative manner for adjusting the current supplied to the current-emitting electrode for reducing the difference signal to a minimum; circuit means operative over a given range of formation resistance values for discontinuing the application of the difference signal to the control portion and for instead applying a fixed bias signal thereto for holding constant the current supplied to the current-emitting electrode; and circuit means jointly responsive to both the current supplied to the current-emitting electrode and the difference signal for providing an output signal which is linear in terms of formation conductivity when the difference signal is being applied to the control portion and which is linear in terms of formation resistivity when the fixed bias signal is being applied to the control portion.

25. In apparatus for investigating earth formations traversed by a borehole, the combination comprising: a coil system adapted for movement through the borehole and including at least one transmitter coil and at least one receiver coil; adjustable current supply means including an electrically-responsive control portion for supplying electrical current to the transmitter coil for electromagnetically inducing electrical current flow in the adjacent earth formations; the receiver coil being responsive to the induced current flow in the adjacent formations for developing a voltage signal which is dependent on the electrical resistance of the adjacent formation material; circuit means for supplying a reference voltage of fixed value; circuit means responsive to both the voltage signal and the fixed reference voltage for developing a difference signal representative of the difference therebetween; circuit means for applying the difference signal to the control portion of the current supply means in a degenerative manner for adjusting the current supplied to the transmitter coil for reducing the difference signal to a minimum; circuit means operative over a given range of formation resistance values for discontinuing the application of the difference signal to the control portion and for instead applying a fixed bias signal thereto for holding constant the current supplied to the transmitter coil; and circuit means jointly responsive to both the current supplied to the transmitter coil and the difference signal for providing an output signal which is linear in terms of formation resistivity when the difference signal is being applied to the control portion and which is linear in terms of formaton conductivity when the fixed bias signal is being applied to the control portion.

References Cited in the file of this patent

UNITED STATES PATENTS 2,776,402     Kokesh                 Jan. 1, 1957